US007289562B2

(12) United States Patent
Yan et al.

(10) Patent No.: US 7,289,562 B2
(45) Date of Patent: Oct. 30, 2007

(54) ADAPTIVE FILTER TO IMPROVE H-264 VIDEO QUALITY

(75) Inventors: Yong Yan, Austin, TX (US); Michael Horowitz, Austin, TX (US); Athar Shah, Austin, TX (US); Richard Hall, Round Rock, TX (US)

(73) Assignee: Polycom, Inc., Pleasanton, CA (US)

( * ) Notice: Subject to any disclaimer, the term of this patent is extended or adjusted under 35 U.S.C. 154(b) by 833 days.

(21) Appl. No.: 10/633,273

(22) Filed: Aug. 1, 2003

(65) Prior Publication Data
US 2005/0025236 A1 Feb. 3, 2005

(51) Int. Cl.
*H04N 7/12* (2006.01)
*H04N 11/02* (2006.01)
*G06K 9/40* (2006.01)

(52) U.S. Cl. .......................... 375/240.03; 375/240.12; 375/240.24; 375/240.25; 382/238

(58) Field of Classification Search ........... 375/240.03, 375/240.12, 240.24, 240.25; 382/266, 268, 382/238
See application file for complete search history.

(56) References Cited

U.S. PATENT DOCUMENTS 7,116,830 B2 * 10/2006 Srinivasan ................. 382/236

2003/0231795 A1 * 12/2003 Karczewicz ............... 382/238
2005/0135484 A1 * 6/2005 Lee et al. .............. 375/240.16

OTHER PUBLICATIONS

List et al., Adaptive Deblocking Filter, Jul. 2003, IEEE Transactions on circuits and systems for video technology, vol. 13 No. 7, pp. 614-619.*

Thomas Wiegand, Gary Sullivan, Ajay Luthra; Draft ITU-T Recommendation and Final Draft International Standard of Joint Video Specification (ITU-T Rec. H.264|ISO/IEC 14496-10 AVC); Joint Video Team (JVT) of ISO/IEC MPEG & ITU-T VCEG, (ISO/IEC JTC1/SC29/WG11 and ITU-T SG16 Q.6); 8th Meeting; Geneva, Switzerland, May 23-27, 2003.

\* cited by examiner

*Primary Examiner*—Gims Philippe
*Assistant Examiner*—Erick Rekstad
(74) *Attorney, Agent, or Firm*—Wong, Cabello, Lutsch, Rutherford & Brucculeri, LLP

(57) ABSTRACT

A method for reducing or eliminating coding artifacts in video pictures processed using intra block prediction methods, for example, according to the H.264 standard. The causes of the coding artifacts are identified to be the intra prediction modes with prediction directions that are not in the direction of the raster scan. Filtering the affected blocks with a simple one-dimensional spatial filter will reduce or even eliminate these coding artifacts.

45 Claims, 6 Drawing Sheets

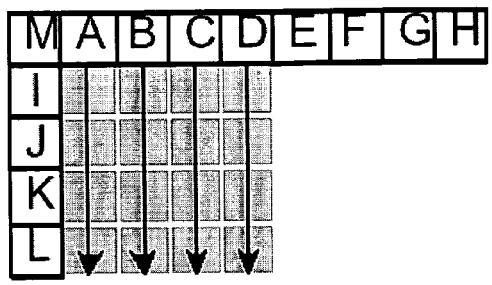
Figure 3.0
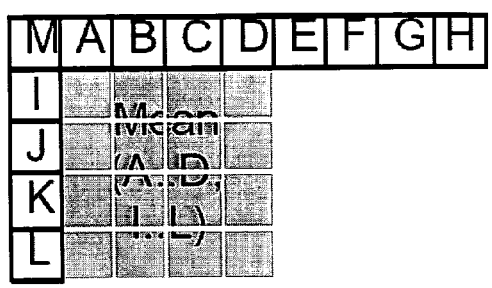
Figure 3.2
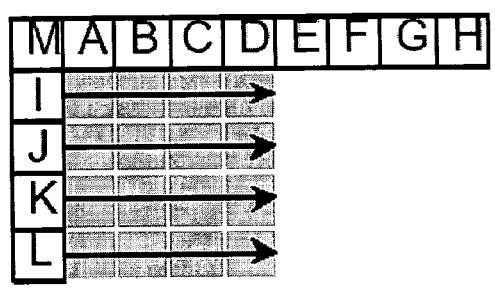
Figure 3.1
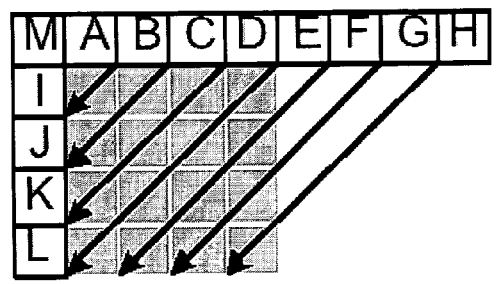
Figure 3.3
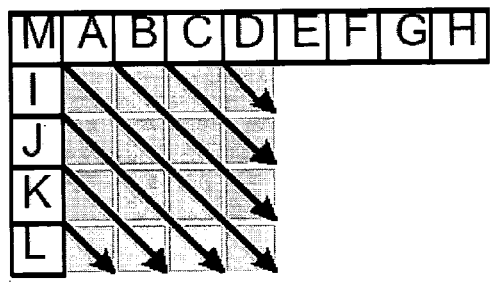
Figure 3.4
(All Figures shown on this sheet are Prior Art)

5 (vertical-right)
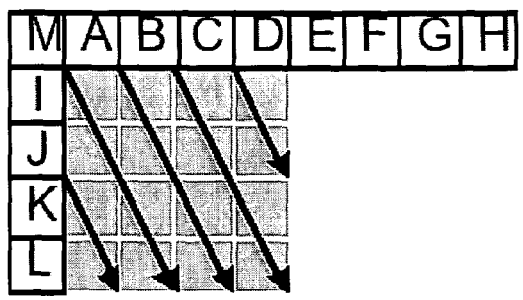
Figure 3.5
6 (horizontal-down)
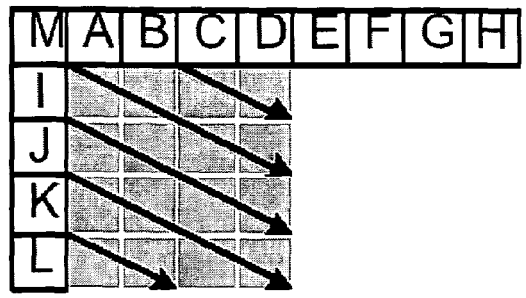
Figure 3.6
(All Figures shown on this sheet are Prior Art)
7 (vertical-left)
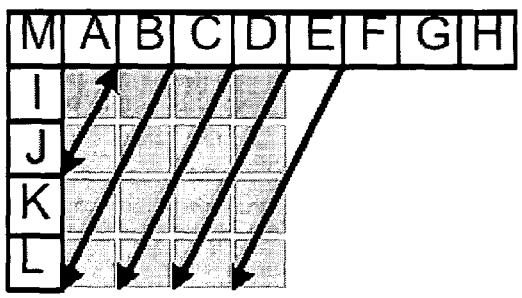
Figure 3.7
8 (horizontal-up)
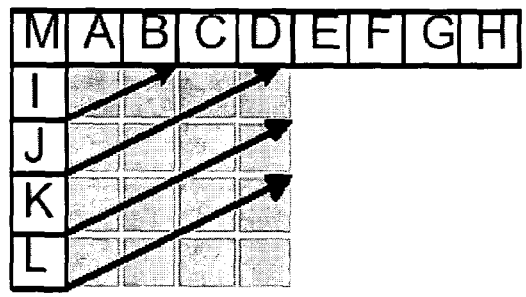
Figure 3.8

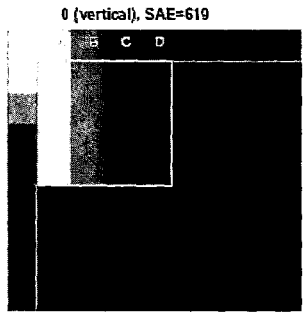
Figure 4.0
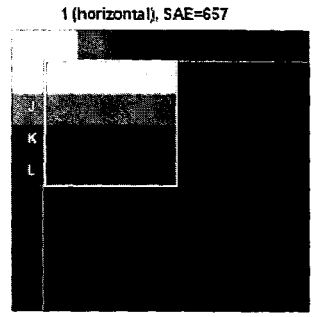
Figure 4.1
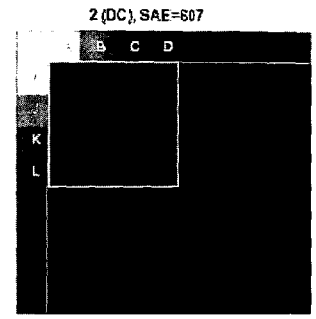
Figure 4.2
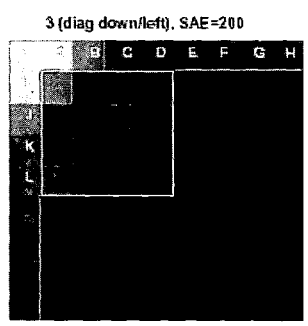
Figure 4.3
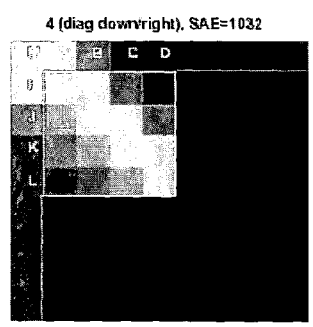
Figure 4.4
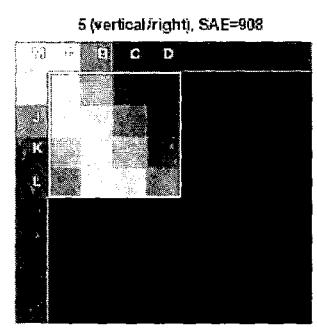
Figure 4.5
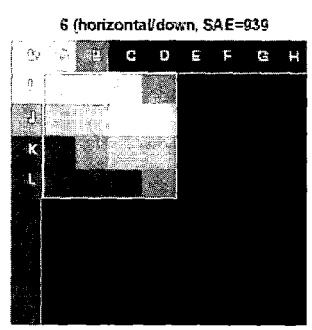
Figure 4.6
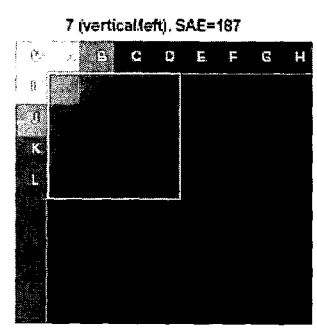
Figure 4.7
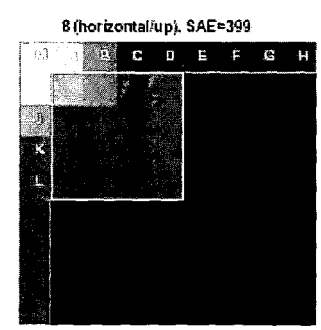
Figure 4.8
(All Figures shown on this sheet are Prior Art)

ADAPTIVE FILTER TO IMPROVE H-264 VIDEO QUALITY

BACKGROUND OF THE INVENTION

1. Field of the Invention

This invention relates to interactive, streaming or broadcast digital video coding, and in particular relates to video coding in compliance with the ITU-T Recommendation H.264.

2. Description of the Related Art

Broadcast television, home entertainment and on-line video streaming have been revolutionized and unified by various video compression technologies. The ISO/IEC MPEG-4 (part 2 visual) and ITU-T H.263 are standards that represent state-of-the-art video compression and decompression technology from circa 2000. In the late 1990's and in parallel with development of H.263 version 3, technical work for a successor to the H.263 video coding standard began within the ITU-T's Video Coding Experts Group (VCEG). In December 2001, the MPEG video group together with VCEG formed a Joint Video Team (JVT) with the goal of leveraging the VCEG work to create a unified video coding standard. The JVT finished work on version 1 of the video coding standard known as ITU-T Recommendation H.264 and ISO/IEC 14496 10 AVC in 2003. It is hereby incorporated by reference.

The new standard surpasses earlier video standards in terms of compression efficiency and resilience to data loss. The improved data compression offers advantages in terms of bandwidth usage. Specifically, given the same video source input, the video pictures reproduced after coding/decoding in compliance with H.264 typically have the same quality as the video pictures reproduced after coding/decoding in compliance with the H.263, MPEG-2 or MPEG-4 (part 2) video coding standards while using approximately half the bandwidth. The many application areas likely to benefit include videoconferencing, video broadcast, streaming and video on mobile devices, telemedicine and distance learning.

Even though H.264 represents a major breakthrough in the video compression technology, there are occasions, especially when coding at low data rates, when the video pictures reproduced after coding/decoding in compliance with the H.264 standard have visual artifacts. Some of those artifacts appear as localized light and dark regions (spanning a few pixels) located along borders or edges of fast-moving objects in the reproduced video pictures. The artifacts appear to make the edges "sparkle." Each pixel in the "sparkle" artifact is referred to as a "sparkle pixel." The artifacts appear more readily when the edges of the moving objects are oriented in certain directions. When the transmission bit rate is below a certain rate (dependent on the video source), the artifacts in the reproduced video pictures increase substantially, and may become very distracting.

It is desirable to identify the causes of the sparkling artifacts so as to identify a method and an apparatus to improve the video quality in order to reduce or eliminate the distracting sparkling artifacts in the reconstructed video pictures.

BRIEF SUMMARY OF THE INVENTION

The present invention identifies the cause of the distracting sparkling artifacts in the video pictures processed in compliance with the H.264 video decoding standard described above. The cause stems from a deficiency in the 4x4 intra prediction process associated with prediction modes whose prediction directions are not in the same general direction as the video raster scan. A method according to the present invention identifies three problem 4x4 intra prediction modes in the intra prediction process. Then, after decoding the bit stream according to the H.264 standard, the method applies a spatial filter, to specific regions in the decoded video pictures to significantly reduce or eliminate such artifacts. Many different filters may be used. A complimentary method of the present invention is to apply a different filter at another location in the video picture processing, e.g. before encoding the video pictures, such that the decoded pictures will have less or no distracting sparkling artifacts.

BRIEF DESCRIPTION OF THE SEVERAL VIEWS OF THE DRAWINGS

A better understanding of the invention can be had when the following detailed description of the preferred embodiments is considered in conjunction with the following drawings, in which:

FIGS. 3.0-3.8 depict the 9 different intra-block prediction modes available according to H.264.

FIGS. 4.0-4.8 depict the 9 different results from the sample as in FIG. 2, after the prediction modes are applied.

DETAILED DESCRIPTION OF THE INVENTION

Figure 1:
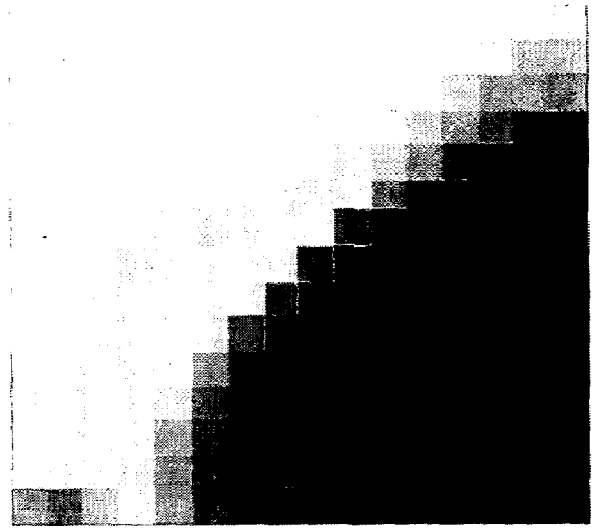
FIG. 1 depicts a sample 16×16 macroblock in a video picture.

Video pictures contain a very large amount of information. It is generally very cumbersome and even impractical to store or transmit raw video pictures. Raw video pictures are generally coded according to a certain scheme. The coded video pictures or bit streams are stored for later viewing or transmitted through a network for viewing at another location. When the video pictures need to be displayed, they are decoded in a reversed coding process and reproduced. H.264 standard defines one of the decoding schemes. A video codec here refers to the encoding and decoding of digital video pictures. A video processing scheme may have some features that are common among all video processing and some features that are peculiar to the scheme. For example, H.264 may have new and unique features, such as intra block prediction, but still uses common transform coding. It is discovered during the investigation that only the intra prediction process is related to the cause of the distracting sparkling artifacts, as will be discussed below.

In encoding and decoding video pictures according to the H.264 standard or most other video coding standards, the video pictures are processed macroblock-by-macroblock and macroblock row by macroblock row. Specifically, the processing starts in the first macroblock row (top-left corner) and proceeds to the end of the row (top-right corner). The subsequent rows are processed in a similar fashion (left to right). This ordering is often referred to as a raster scan order or simply a raster scan (such as in an analog TV). It follows that in any neighborhood, a pixel to the left is reproduced before a pixel to the right and a pixel above is reproduced before the pixel below. Therefore, the values of pixels to the left or above are known before the values of the pixels to the right or below. For the convenience of discussion below, a direction from left to right horizontally is defined as the +X direction; a direction from top to bottom vertically is defined as +Y direction. A "first quadrant direction" is defined as a direction that lies between the +X direction and +Y direction, including +X direction and +Y direction. More specifically, any direction that starts out as a +X direction, rotates clockwise until it overlaps with the +Y direction, is a "first quadrant direction." Any direction that starts out from the +Y direction (+Y direction not included), rotates clockwise until it overlaps with the −X direction (−X direction not included) is a "second quadrant direction." Any direction that starts out from −Y direction (−Y direction not included), rotates clockwise until it overlaps the +X direction (+X direction not included), is a "fourth quadrant direction."

Two of the features in a H.264 compliant codec that improve the codec's coding efficiency are the inter-block prediction and the intra-block prediction. Each picture may have numerous pixels, which may be grouped into macroblocks and blocks. A macroblock represents a portion of a picture containing a 16×16 pixel region. A macroblock may be partitioned into sixteen (16) luma blocks each containing 4×4 luma pixels. Macroblocks may be coded with "inter-block" prediction, meaning that information from previously coded pictures is used to predict the content of the picture currently being coded. Macroblocks may also be coded with "intra-block" prediction, meaning that information from previously coded blocks in the same picture is used to predict the content of the block currently being coded. The intra-block prediction methods in H.264 are described in the H.264 standard, Section 8.3 Intra Prediction Process. The particular mode of intra-block prediction used in coding a particular block is determined by the features of the particular block. The selected mode of intra-block prediction is indicated in the encoded video bit stream. A H.264 compliant codec can then decode the video pictures using the indicated mode of intra-block prediction and reproduce the video pictures.

An H.264 compliant codec typically uses a Quantization Parameter (QP) to adjust the overall bit rate to achieve some target rate, i.e. channel bandwidth. The smaller the QP, the greater the amount of information conveyed in the encoded bit stream and the higher the corresponding bit rate. The larger the QP, the smaller the amount of information conveyed in the bit stream. Furthermore, the larger the QP, the poorer the quality of the decoded or reproduced video pictures. The choice of QP of a particular picture is related to, among other things, the complexity of the video picture, the degree of change between adjacent pictures, and the target bit rate.

Figure 2:
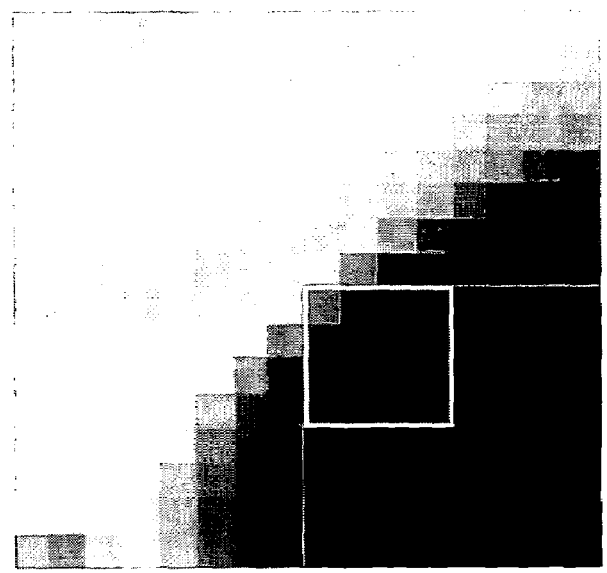
FIG. 2 depicts a sample of a 4×4 block to be predicted, which is within the 16×16 marcoblock.

In FIGS. 1 and 2, a portion of a sample picture is shown. FIG. 2 shows a macroblock at the lower-right corner to be coded using intra-prediction. The pixels in the portions at the top or the right are presumably available for prediction.

FIGS. 3.0-3.8 depict the nine (9) different 4×4 intra-block prediction modes according to the H.264 standard. The actual algorithm for each mode is specified and mandated in Section 8.3.1.2.1 through Section 8.3.1.2.9 of the H.264 standard, which are incorporated by reference. FIGS. 4.0-4.8 illustrate the reproduced block for each prediction mode. For a particular block, the encoder will select the prediction mode that minimizes the difference error (error between the actual block and the predicted block). The selected prediction mode is indicated in the coded video bit stream, along with the residual. The residual is computed by taking a pixel-by-pixel difference between the predicted block and the block in the original video picture that is being coded. In the above illustration FIGS. 4.0-4.8, mode 7 (FIG. 4.7) is selected because the attributes of the block in the picture (bottom-left to top-right orientation) correspond to that particular prediction mode.

Figure 5:
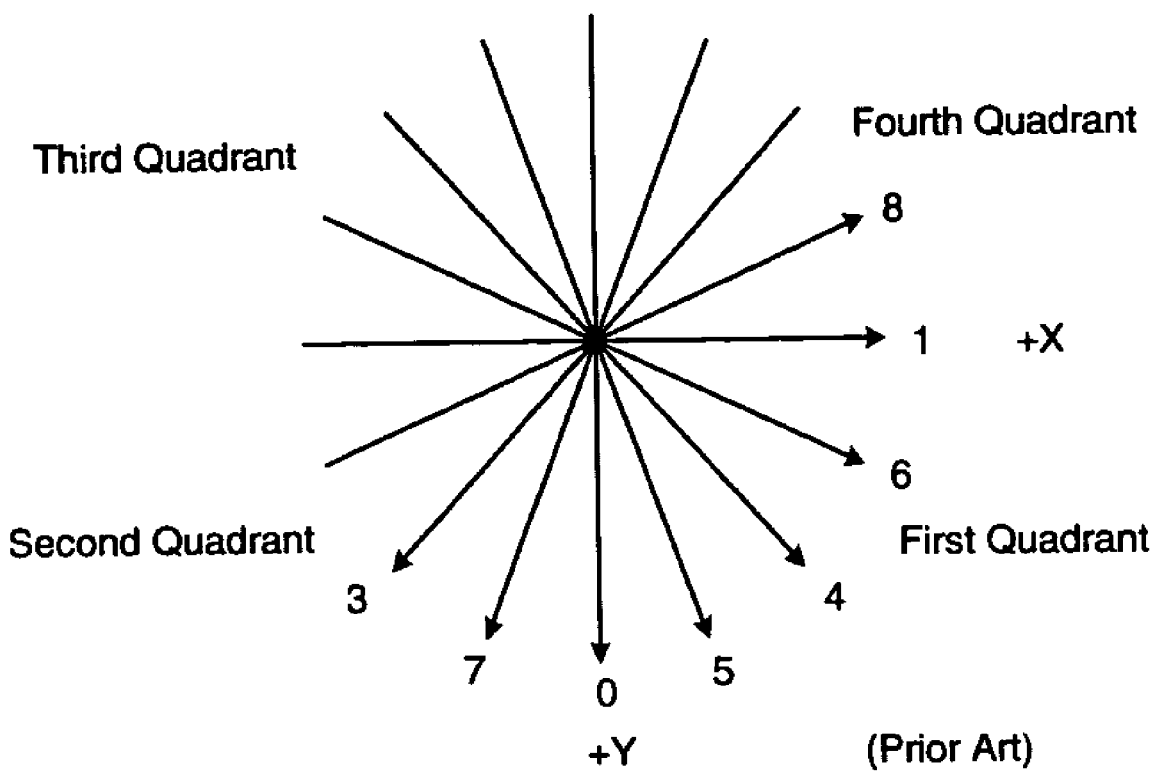
FIG. 5 depicts the mode directions of the 9 modes.

FIG. 5 further illustrates the prediction directions of the above mentioned nine (9) intra-block prediction modes. A prediction direction is the direction from the base pixels to the predicted pixels. For example, in mode 0 (vertical), the predicted pixel is determined by the pixels vertically above it. Therefore, the prediction direction is vertically downward (as indicated in FIG. 3.0), or the +Y direction. The prediction direction of mode 0 is a "first quadrant direction." In mode 3 (diagonal down-left), the predicted pixel is determined by the pixels to the upper-right. Therefore, the prediction direction (as indicated in FIG. 3.3 and FIG. 5) is from upper-right to lower-left. The prediction direction of mode 3 is a "second quadrant direction." Similarly, the prediction directions of modes 0, 1, 4, 5 and 6 are "first quadrant directions." The prediction directions of modes 3 and 7 are "second quadrant directions." The prediction direction of mode 8 is a "fourth quadrant direction." In mode 2, the predicted pixel is the average of all pixels around the block. Therefore, mode 2 has no direction.

During the investigation into the causes of the sparkling artifacts in H.264 decoded video pictures, it is observed that the artifacts appear more pronounced when the scenes being coded require the quality of the H.264 coded video picture to be significantly reduced in order to achieve some fixed target data rate (i.e., a higher quantization parameter is used).

It is also discovered that the sparkling artifacts appear near the edges of fast-moving objects in the decoded and rendered video pictures. In the vicinity of the sparkling edges of objects in a video picture, it is further discovered that the artifacts appear in edges having an orientation of diagonal down-left (mode 3), vertical-left (mode 7) and horizontal-up (mode 8) as defined in the H.264 standard or as we have defined here, in the second or fourth quadrant directions. The vicinity of an edge of an object in a picture is an area in the picture zero to several pixels (for example 4 pixels for pictures in a CIF format) away from the edge of the object. The vicinity of the edge may include the area both above/left to the edge, and down/right to the edge. When the sparkling artifacts appear near an edge of an object, appreciable amount of the total pixels in the vicinity of the edge are sparkle pixels.

It is discovered that when modes 3, 7 or 8 are used, the resulting reproduced pictures have substantial sparkling artifacts. It is also discovered that these three prediction modes all have prediction directions that are second or fourth quadrant directions. The prediction directions of these three modes are, to some extent, against the direction of the raster scan. The other five 4×4 intra prediction modes (modes 0, 1, 4, 5 and 6) have prediction directions that are first-quadrant directions, which are generally in the same direction as the raster scan. The remaining prediction mode, mode 2, does not have an associated direction.

Because the prediction directions in the three problem modes are not in the same general direction as the raster scan, some of the pixels, which would ideally be used to predict the pixels in the current block, are not available. Instead, pixels from non-optimal locations are used for prediction. Consequently, when a 4×4 intra prediction employs one of these three modes, the residual tends to be large (as a result of the poor prediction). If the residual is coded with too high a QP value, visually objectionable sparkling artifacts result. The high QP value may result when the available video bandwidth is insufficient to effectively code a video scene.

Once the cause of the sparkling artifacts is identified to be the use of an intra-block prediction mode whose prediction direction is a second or fourth quadrant direction, a solution may be found. In the case of H.264, the cause of the sparkling artifacts is the use of three specific 4×4 intra-block prediction modes, i.e. modes 3, 7 and 8. A spatial filter is used to reduce the visibility of the sparkling artifacts. Specifically, the filter is designed to smooth the regions in the decoded video picture corresponding to the use of the three problem 4×4 intra prediction modes. It may be beneficial to filter the entire 16×16 macroblock when one or more of its 4×4 blocks are identified as needing filtering.

Figure 6:
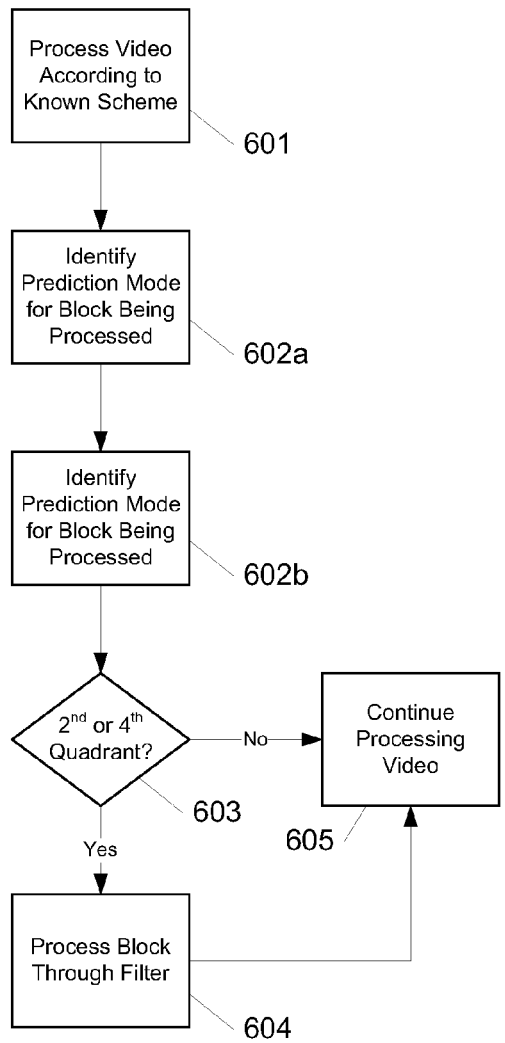
FIG. 6 depicts a method of applying a filter to video blocks based on the direction of a prediction mode.

An example process for applying this filtering is illustrated in FIG. 6. One simple way to reduce the artifact caused by the problem 4×4 intra prediction is to put a filter (block 604) after decoding (block 601). In one embodiment of the current invention, a simple 3-tap linear Finite Impulse Response filter (FIR) may be used, which may be [¼, ½, ¼]. The overhead caused by this additional processing is typically small and the distracting sparkling artifacts are reduced significantly. To reduce the coding artifacts further, other more sophisticated filters may be used, for example, a vertical filter (instead of a horizontal filter), a FIR filter with more taps, or a 2-dimensional FIR filter.

During the decoding process, it is determined whether a given macroblock is 4×4 intra coded (block 602a). If the macroblock is 4×4 intra-coded, then the specific prediction mode is identified (block 602b). If the prediction mode happens to be one of the three problem modes (block 603), then an additional post-decoding step (block 604) is performed prior to rendering the decoded video picture. Specifically, the decoded video picture is passed through a predetermined spatial filter designed to mitigate the distracting sparkling artifacts. In the embodiment discussed above, the spatial filter is a 3-tap FIR with tap weights [¼, ½, ¼]. With the application of the spatial filter, substantial amount of the sparkle pixels in the reproduced pictures may be eliminated. The effectiveness of the sparkle pixel reduction process depends on the complexity of the scene being coded as well as the filter characteristics. In some cases, virtually all of the sparkling artifacts can be eliminated.

Instead of using a post-decoding filter, a pre-encoding filter may be applied. The filter would be designed to eliminate or reduce the potential residual that would likely result in the selection of one of the three problem 4×4 intra block prediction modes during the encoding process. The filter would be designed such that it would only smooth in the vicinity of the boundaries or edges whose orientation corresponds to the second or fourth quadrant directions. The filter would have little or no effect on picture regions that do not have such boundaries or edges. After being modified (smoothed) by this pre-filter, the video picture could have features that are less likely to be encoded using one of the three problem intra-block prediction modes. Even if these predicted modes are chosen, the pre-filtering will result in a lower amount of residual energy (as compared to the coding of the non-filtered image) which in turn would reduce or eliminate the sparkling artifacts. The filtered video pictures will be encoded and decoded according to H.264 as usual.

As indicated above, the sparkling artifacts are not problematic when there are enough bits to effectively code the residual. In this sense, the coding artifacts are related to the bandwidth, but are not entirely determined by the bandwidth. Some scenes, for example, a lecture with a single speaker and a plain background at CIF (352×288) resolution, coded at low bandwidths (e.g. 128 Kbps) would not exhibit significant sparkling artifacts, because enough bits would be available to effectively code the residual. Other, more complex scenes such as a basketball game might exhibit the sparkling artifacts even at high bandwidths (e.g. 1024 Kbps), because the complexity of the scene does not leave enough bits to adequately code the residual.

Figure 7:
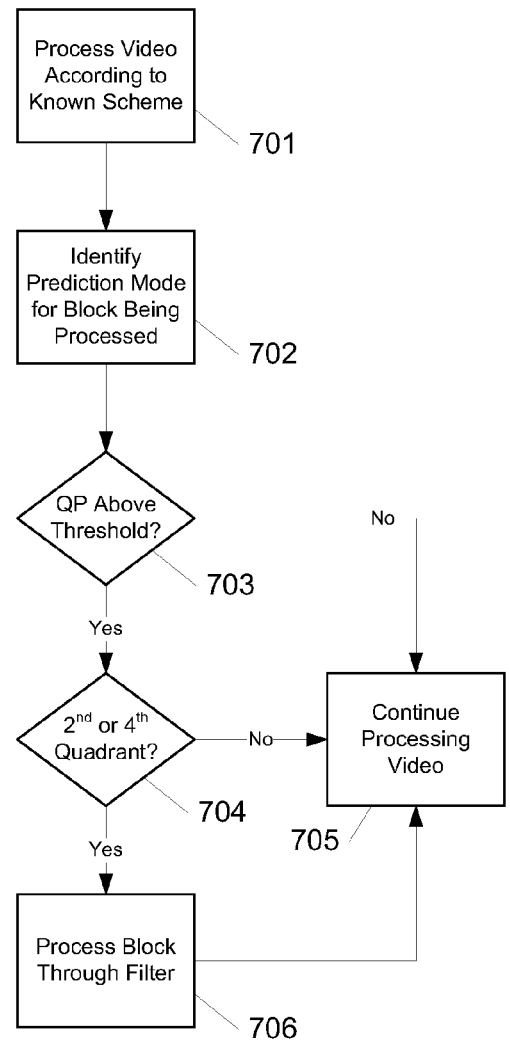
FIG. 7 depicts a method of applying a filter to video blocks based on the quantization parameter QP.

It is discovered that QP is a good indicator of whether there will be significant sparkling artifacts in the reproduced video pictures. Specifically, if one of the 3 problem intra prediction modes is selected (determined in blocks 702 and 704) and the QP is large, the residual will most likely not be coded accurately enough to compensate for the poor prediction. In this regard, the QP value can be used to selectively apply the artifact reduction process, as illustrated in FIG. 7. If the QP is below a given threshold (corresponding to a "No" decision in block 703), the sparkling artifacts may be insignificant and tolerable and the artifact reduction process is not needed. In this situation, the artifact reduction process is not activated (block 705). If the QP is above the threshold (corresponding to a "Yes" decision in block 703), then the artifact reduction process is needed. In this situation, the artifact reduction process is activated (block 706). The additional process for artifact reduction is inserted, after the decoding process (block 701), but before the displaying process (not shown), in the post-filter embodiment. The selection of a particular QP threshold is a design choice. It represents a balance between computational overhead, the picture sharpness and the amount of allowable coding artifacts. The threshold value of QP may vary depending on the type of video: smooth or highly detailed, stationary or full of motion. With respect to the H.264 codec, a QP threshold between 20 and 35 represents a good compromise. The QP threshold may also be adjusted depending on the reproduced pictures.

The present invention is not limited to the improvement of video pictures processed by the H.264 codec. The present invention may be equally applicable to any picture processing where n×m intra-block prediction method is employed, especially in real-time video broadcasting or real-time video conferencing applications. n and m may be any integers which are greater than 1. The particular intra-block prediction mode selected to code a particular block is determined by the picture features of the block. For example, a border line in the direction of lower-left to upper-right in the block will mandate the selection of a mode with prediction direction of lower-left to upper-right, i.e. in the second quadrant direction or fourth quadrant direction. These features are not aligned with the raster scan direction. When a picture region is predicted using an intra-block prediction mode that has a prediction direction that is not in line with the raster scan direction, then the prediction is poor, i.e. the residual is large. When the QP is large, i.e. there are not enough bits to encode the residual, significant amount of visually distracting artifacts will appear. A suitable smoothing filter, either a pre-encoding filter or a post-decoding filter, may be added to reduce or eliminate these types of artifacts.

While illustrative embodiments of the invention have been illustrated and described, it will be appreciated by those skilled in the art that various changes can be made therein without departing from the spirit and scope of the invention.

The invention claimed is:

1. A method for improving video picture processing according to a known scheme,
wherein the scheme includes n×m intra-block prediction with a prediction direction, where n and m are integers greater than 1,
wherein the intra-block prediction mode selected in the coding of a block is indicated in the coded bit stream;
wherein the video pictures are acquired, coded, transmitted, decoded, and displayed;
the method comprising:
processing the video pictures according to the known scheme;
identifying the prediction mode for an n×m block being processed;
if the prediction mode has a prediction direction and the prediction direction is a second quadrant direction or a fourth quadrant direction, then processing the block through a filter and if the prediction mode has no prediction direction or a first quadrant direction or a third quadrant direction then not processing the block through the filter, and
continuing processing the video pictures.

2. The method in claim 1, wherein the processing the block through a filter is after the block being decoded according to the selected prediction mode and before the block being displayed.

3. The method in claim 2, wherein the filter is a one-dimensional horizontal filter.

4. The method in claim 3, wherein the filter is an l-tap FIR filter.

5. The method in claim 4, wherein the l-tap FIR filter is a [¼, ½, ¼] FIR filter.

6. The method in claim 2, wherein the filter is a one-dimensional vertical filter.

7. The method in claim 2, wherein the filter is a two-dimensional filter.

8. The method in claim 1, wherein the known scheme includes a decoding process in compliance with H.264.

9. The method in claim 8, wherein the prediction direction is one of the directions of mode 3, mode 7 or mode 8 of the intra-block prediction modes of H.264.

10. The method in claim 9, wherein the n×m block is the 4×4 block.

11. The method in claim 10, wherein processing the block through a filter is after the block is decoded according to the selected prediction mode.

12. The method in claim 11, wherein the filter is a one-dimensional horizontal filter.

13. The method in claim 12, wherein the filter is a 3-tap [¼, ½, ¼] FIR filter.

14. The method in claim 11, wherein the filter is a one-dimensional vertical filter.

15. The method in claim 11, wherein the filter is a two-dimensional filter.

16. The method in claim 10, further comprising:
processing the 16×16 macroblock through the filter, wherein the 4×4 block is a portion of the 16×16 macroblock.

17. A method for improving video picture processing according to a known scheme,
wherein the scheme includes n×m intra-block prediction with a prediction direction, where n and m are integers greater than 1,
wherein the intra-block prediction mode selected in the coding of a block is indicated in the coded video pictures;
wherein the video pictures are acquired, coded, transmitted, decoded, and displayed;
the method comprising:
processing the video pictures according to the known scheme;
identifying the quantization parameter;
identifying the prediction mode for an n×m block being processed;
if the quantization parameter is above a threshold, the prediction mode has a prediction direction and the prediction direction is a second quadrant direction or a fourth quadrant direction, then processing the block through a filter and if the prediction mode has no prediction direction or a first quadrant direction or a third quadrant direction then not processing the block through the filter, and
continuing processing the video pictures.

18. The method in claim 17, wherein the processing the block through a filter is after the block being decoded according to the selected prediction mode and before the block being displayed.

19. The method in claim 18, wherein the filter is a one-dimensional horizontal filter.

20. The method in claim 19, wherein the filter is an l-tap FIR filter.

21. The method in claim 20, wherein the l-tap FIR filter is a 3-tap [¼, ½, ¼] FIR filter.

22. The method in claim 18, wherein the filter is a one-dimensional vertical filter.

23. The method in claim 18, wherein the filter is a two-dimensional filter.

24. The method in claim 17, wherein the known scheme includes a decoding process in compliance with H.264.

25. The method in claim 24, wherein the prediction direction is one of the directions of mode 3, mode 7 or mode 8 of the intra-block prediction modes of H.264.

26. The method in claim 25, wherein the threshold is between 20 and 35.

27. The method in claim 26, wherein the n×m block is the 4×4 block.

28. The method in claim 27, wherein the processing the block through a filter is after the block being decoded according to the selected prediction mode.

29. The method in claim 28, wherein the filter is a one-dimensional horizontal filter.

30. The method in claim 29, wherein the filter is a 3-tap [¼, ½, ¼] FIR filter.

31. The method in claim 28, wherein the filter is a one-dimensional vertical filter.

32. The method in claim 28, wherein the filter is a two-dimensional filter.

33. The method in claim 27, further comprising:
processing the 16×16 macroblock through the filter, wherein the 4×4 block is a portion of the 16×16 macroblock.

34. A method for improving video picture processing according to a known scheme,
wherein the scheme includes n×m intra-block prediction with a prediction direction, where n and m are integers greater than 1,
wherein the intra-block prediction mode selected in the coding of a block is indicated in the coded bit stream;
wherein the video pictures are acquired, coded, transmitted, decoded, and displayed;
the method comprising:
filtering the video pictures with a filter, wherein the filter is operative to smooth the edges of objects in the pictures, wherein the edges having an orientation in a second quadrant direction or a fourth quadrant direction;

wherein the filter is operative to leave all other areas of the picture unaffected;

encoding the video pictures according to the known scheme; and generating bit stream.

35. The method in claim 34, wherein the known scheme includes a decoding process in compliance with H.264.

36. A method for improving the quality of video images processed using intra block prediction, the method comprising applying a filter to one or more blocks of the image, wherein the filter reduces artifacts associated with intra block prediction in a second quadrant direction or a fourth quadrant direction and otherwise leaves the block unchanged.

37. The method of claim 36 wherein the filter is applied after decoding.

38. The method of claim 37 wherein the filter is applied prior to encoding.

39. The method of claim 36 wherein the filter is a horizontal filter.

40. The method of claim 36 wherein the filter is a vertical filter.

41. The method of claim 36 wherein the filter is a two-dimensional filter.

42. The method of claim 36 wherein the filter is applied only if the quantization parameter exceeds a predetermined threshold.

43. A video picture produced by the method in any one of claims 1-17, 34, and 36.

44. A computer system comprising:

a central processing unit, a memory module;

wherein the central processing unit is operative to perform the method in any one of claims 1-17, 34, and 36.

45. A computer readable medium containing computer executable program operative to perform the method in any one of claims 1-17, 34, and 36.

* * * * *